United States Patent
Okazaki et al.

(10) Patent No.: US 7,835,865 B2
(45) Date of Patent: Nov. 16, 2010

(54) OBSTACLE DETECTING CONTROL DEVICE OF VEHICLE

(75) Inventors: Haruki Okazaki, Hiroshima (JP); Hiroshi Ohmura, Hiroshima (JP); Takayuki Seto, Hiroshima (JP); Takashi Nakagami, Hiroshima (JP)

(73) Assignee: Mazda Motor Corporation (JP)

( * ) Notice: Subject to any disclaimer, the term of this patent is extended or adjusted under 35 U.S.C. 154(b) by 853 days.

(21) Appl. No.: 11/730,426

(22) Filed: Apr. 2, 2007

(65) Prior Publication Data

US 2007/0239358 A1    Oct. 11, 2007

(30) Foreign Application Priority Data

Apr. 7, 2006  (JP)  .............................. 2006-106549

(51) Int. Cl.
*B60R 21/00* (2006.01)
*G06F 19/00* (2006.01)
(52) U.S. Cl. .................. 701/300; 701/96; 340/435; 340/901
(58) Field of Classification Search .......... 701/300, 701/301, 93, 96; 340/435, 901; 342/70, 342/455
See application file for complete search history.

(56) References Cited

U.S. PATENT DOCUMENTS

| | | | | |
|---|---|---|---|---|
| 5,680,097 A | * | 10/1997 | Uemura et al. | 340/435 |
| 5,689,264 A | | 11/1997 | Ishikawa et al. | |
| 5,959,569 A | * | 9/1999 | Khodabhai | 342/70 |
| 6,025,797 A | | 2/2000 | Kawai et al. | |
| 6,202,027 B1 | | 3/2001 | Alland et al. | |
| 6,282,483 B1 | | 8/2001 | Yano et al. | |
| 6,317,693 B2 | * | 11/2001 | Kodaka et al. | 701/301 |
| 6,442,484 B1 | * | 8/2002 | Miller et al. | 701/301 |
| 7,136,755 B2 | * | 11/2006 | Yamamura | 701/301 |

FOREIGN PATENT DOCUMENTS

| | | |
|---|---|---|
| DE | 10018556 A1 | 10/2001 |
| EP | 1387183 A | 2/2004 |
| JP | 07-215147 | 8/1995 |

OTHER PUBLICATIONS

European Search Report; EP07006447; Mailed Oct. 19, 2007.

* cited by examiner

*Primary Examiner*—Tan Q Nguyen
(74) *Attorney, Agent, or Firm*—Studebaker & Brackett PC; Donald R. Studebaker

(57) ABSTRACT

An offset distance of an obstacle from a traveling-path center line of a vehicle at the time the obstacle is detected is calculated, and then this offset distance of the obstacle from the traveling-path center line of the vehicle is corrected based on a turning radius of the traveling vehicle detected at the time a specified period of time has lapsed. Thereby, even in a case where the vehicle travels on a road with a curve that changes a radius of curvature of the traveling-path center line (turning radius of the traveling vehicle) quickly during the specified period of traveling time, the above-described offset distance can be properly corrected based on an updated turning radius of the traveling vehicle. Thus, a relative position of the obstacle with respect to the vehicle can be predicted accurately.

6 Claims, 6 Drawing Sheets

OBSTACLE DETECTING CONTROL DEVICE OF VEHICLE

BACKGROUND OF THE INVENTION

The present invention relates to an obstacle detecting control device of a vehicle that comprises a radar device to detect an obstacle in front of the vehicle.

Conventionally, an obstacle detecting control device of a vehicle that detects an obstacle with a radar device is known. Some type of such obstacle detecting control device comprises a yaw-rate detection sensor to detect a yaw rate of the vehicle, a steering-angle sensor to detect a steering angle of a steering wheel of the vehicle, or the like, to detect a turning radius of the traveling vehicle based on detection values of such sensors, and thereby predicts a traveling path of the vehicle (a radius of curvature of a traveling-path center line) based on the detected turning radius of the traveling vehicle (Japanese Patent Laid-Open Publication No. 7-215147, U.S. Pat. No. 5,689,264, for example). Herein, a position of the detected obstacle at the time a specified period of time (a radar scanning time) has lapsed is predicted based on the predicted traveling path, and determination as to whether or not an obstacle that is detected at the time the specified period of time has lapsed after the detection of the obstacle is identical to the above-described obstacle whose position has been predicted is made based on the above-described position prediction. A device disclosed in the above-described US patent is also capable of continuing pursuit of the obstacle with the above-described positron prediction even if the detection of obstacle is failed temporarily.

Herein, the above-described position prediction of the obstacle could be easier by calculating an offset distance of the obstacle from a center line of the predicted traveling path at the time the obstacle is detected and by using this calculated offset distance in a case where the detected obstacle is a stationary obstacle (a relative speed of the obstacle with respect to the vehicle may be detected by the radar device, and it may be determined based on this relative speed and a traveling speed of the vehicle whether the detected obstacle is the stationary one or not, for example). Namely, since in general the radius of curvature of the traveling-path center line (turning radius of the traveling vehicle) may not change so greatly during the traveling of the vehicle, the position of the stationary obstacle could be predicted easily by assuming that the above-described offset distance of the stationary obstacle from the center line of the predicted traveling path does not change during the above-described specified period of time. Determination as to whether the traveling vehicle hits the obstacle or not may be also made easily based on the amount of the offset distance.

However, in fact, there exists a traveling road with a curve that changes the radius of curvature of the traveling-path center line (turning radius of the traveling vehicle) so quickly during the specified period of traveling time (especially, at around an exist or entrance portion of a corner of the curving road). Thus, when the vehicle travels on this kind of curving road, there is a problem in that the obstacle's position could not be predicted accurately.

SUMMARY OF THE INVENTION

The present invention has been devised in view of the above-described problem, and an object of the present invention is to provide an obstacle detecting control device of a vehicle that can accurately predict the relative position of the obstacle with respect to the vehicle.

According to the present invention, there is provided an obstacle detecting control device of a vehicle, comprising a radar device to detect an obstacle in front of the vehicle and a position of the obstacle detected, an operational-device control device to control an operational device of the vehicle based on obstacle-detection information detected by the radar device, and a vehicle-turning radius detecting device to detect a turning radius of the vehicle, wherein the radar device is configured to predict a position of the detected obstacle that moves relatively with respect to the vehicle during a specified period of time, the prediction of the position of the obstacle by the radar device comprising calculation of an offset distance of the obstacle from a traveling-path center line of the vehicle at the time the obstacle is detected and correction of the offset distance of the obstacle from the traveling-path center line of the vehicle that is made based on the turning radius of the traveling vehicle detected by the vehicle-turning radius detecting device at the time the specified period of time has lapsed.

According to the above-described present invention, the offset distance of the obstacle from the traveling-path center line of the vehicle at the time the obstacle is detected is calculated, and then this offset distance of the obstacle from the traveling-path center line of the vehicle is corrected based on the turning radius of the traveling vehicle detected at the time the specified period of time has lapsed. Thereby, even in a case where the vehicle travels on the road with the curve that changes the radius of curvature of the traveling-path center line (turning radius of the traveling vehicle) quickly during the specified period of traveling time, the above-described offset distance can be properly corrected based on the updated turning radius of the traveling vehicle. Thus, the relative position of the obstacle with respect to the vehicle can be predicted accurately.

According to an embodiment of the present invention, the radar device is a millimeter-wave radar device. Thereby, the obstacle can be properly detected even in a rainy or foggy condition, so the appropriate radar device for the vehicle can be provided.

According to another embodiment of the present invention, the vehicle-turning radius detecting device comprises a yaw-rate detection sensor to detect a yaw rate of the vehicle.

Further, according to another embodiment of the present invention, the vehicle-turning radius detecting device comprises a lateral-acceleration detection sensor to detect a lateral acceleration of the vehicle.

According to the above-described embodiments, the turning radius of the vehicle can be detected accurately, and thereby the relative position of the obstacle with respect to the vehicle can be predicted properly.

According to another embodiment of the present invention, the operational device of the vehicle is a brake operating device to operate brake of the vehicle.

Further, according to another embodiment of the present invention, the operational device of the vehicle is a seatbelt pre-tensioner to restrain a passenger with application of a specified tension to a seatbelt by winding up the seatbelt.

According to the above-described embodiments, the brake operating device or the seatbelt pre-tensioner can be prevented from operating wrongly, and thereby the safety of the passenger can be improved properly.

Other features, aspects, and advantages of the present invention will become apparent from the following description which refers to the accompanying drawings.

BRIEF DESCRIPTION OF THE DRAWINGS

FIGS. 5A and 5B are diagrams showing relationships between a lateral relative position, an offset distance of an obstacle from a traveling-path center line, a turning radius and the like.

DETAILED DESCRIPTION OF THE INVENTION

Hereinafter, a preferred embodiment of the present invention will be described referring to the accompanying drawings.

Figure 1:
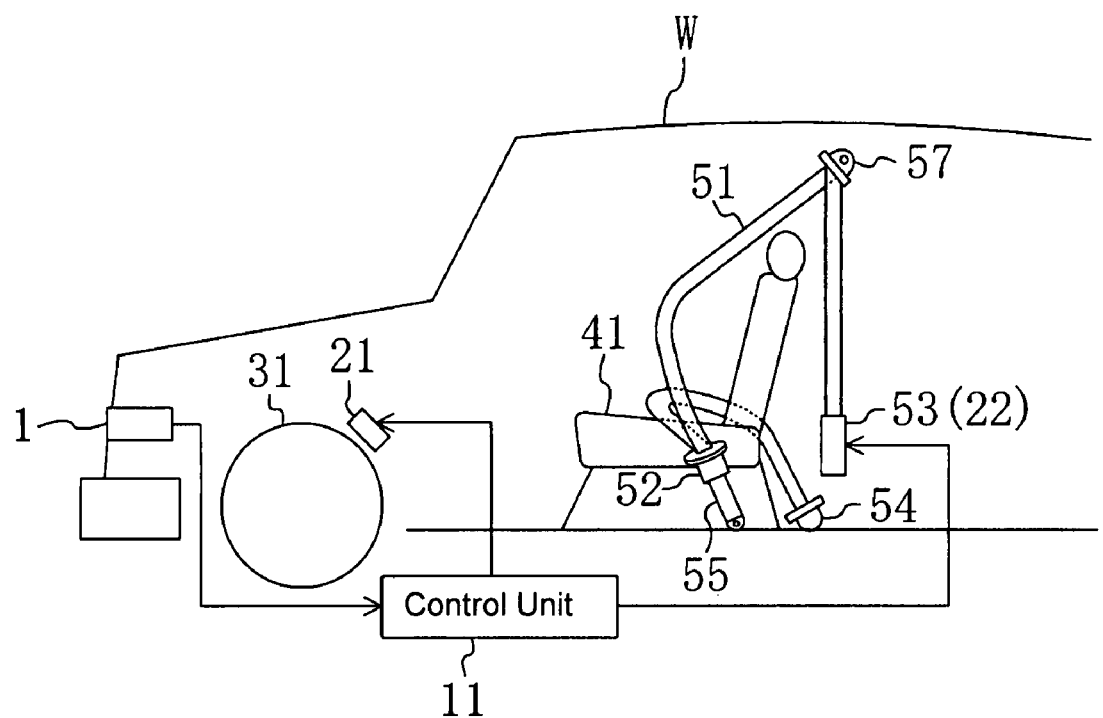
FIG. 1 is a front portion diagram of a vehicle equipped with an obstacle detecting control device according to an embodiment of the present invention.

FIG. 1 shows a vehicle W (a traveling vehicle as an automotive vehicle in the present embodiment) that is equipped with an obstacle detecting control device according to an embodiment of the present invention. A radar device 1 to detect an obstacle that may exist in front of the vehicle W is provided at a front end portion of the vehicle W. The radar device 1 is a millimeter-wave radar device, which comprises, as shown in FIG. 2, a signal-transmitting portion 2 that transmits millimeter waves forward, scanning a specified-angled area in a substantially horizontal direction, a signal-receiving portion 3 that receives millimeter waves reflected on the obstacle in front of the vehicle W, and a processing portion 4 that performs the following obstacle-detection processing based on data received by the signal-receiving portion 3.

The vehicle W is also equipped with a control unit 11 as an operational-device control device to control an operational device of the vehicle W based on obstacle-detection information from the processing portion 4 of the radar device 1. Herein, the operational device includes a brake operating device 21 and a seatbelt pre-tensioner 22.

Figure 2:
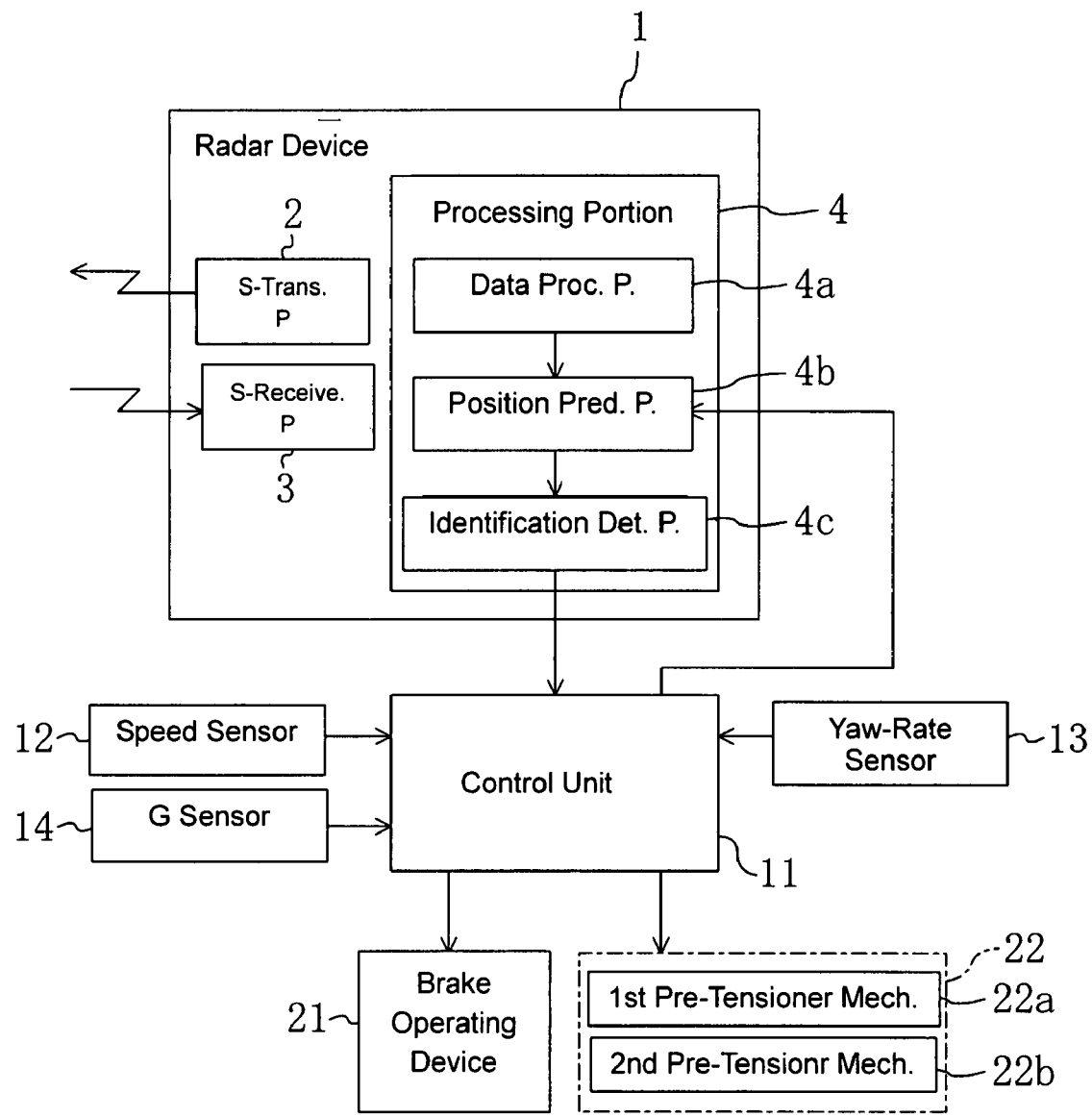
FIG. 2 is a block diagram showing the obstacle detecting control device.

The vehicle W also comprises, as shown in FIG. 2, a vehicle speed sensor 12 to detect a traveling speed of the vehicle W, a yaw-rate sensor 13 to detect a yaw rate generating at the vehicle W, and a G sensor 4 to detect hitting of the vehicle W against the obstacle. Detection information of these sensors 12-14 are inputted to the control unit 11.

The brake operating device 21 operates brake of the vehicle W to apply a braking force to vehicle wheels 31. The seatbelt pre-tensioner 22 operates to restrain a passenger seated in a seat 41 of the vehicle W with application of a specified tension to a seatbelt 51 by winding up the seatbelt 51.

Hereinafter, a seatbelt device of the vehicle W will be described. The seatbelt device is a three-point type of seatbelt, as shown in FIG. 1, that comprises a retractor portion 53 to wind up the seatbelt 51, a lap anchor portion 54 to which a tip of the seatbelt 51 withdrawn from the retractor 53 is connected, a buckle portion 55 to which a tongue 52 provided at a central portion of the seatbelt 51 is detachably connected. The buckle portion 55 is fixed to a vehicle body beside the seat 41, and the retractor 53 and the lap anchor portion 54 are fixed to the vehicle body on its opposite side of the seat 41. The seatbelt 51 withdrawn from the retractor portion 53 is changed from upward to downward in its withdrawal direction by a slip guide 57 provided at an upper portion of the seat 41, and its tip end is attached to the lap anchor portion 54. The above-described tongue 52 is provided to move over the seatbelt 51 between the slip guide 57 and the lap anchor portion 54. The seatbelt 51 is applied by engaging the tongue 52 with the buckle portion 55.

The seatbelt pre-tensioner 22 is provided in the retractor portion 53 of the above-described seatbelt device. The seatbelt pre-tensioner 22 of the present embodiment comprises, as shown in FIG. 2, a first pre-tensioner mechanism 22a, in which the seatbelt 51 is wound up by an electric motor or the like, and a second pre-tensioner mechanism 22b, in which the seatbelt 51 is wound up with a force of gas generated by an inflator. When the hitting of the vehicle W against the obstacle is predicted (for example, a predicted time of hitting is shorter than a predetermined standard time) based on the obstacle detecting information supplied from the processing portion 4 of the radar device 1, the above-described control unit 11 operates the first pre-tensioner mechanism 22a to apply a specified tension to the seatbelt 51. Meanwhile, when the hitting of the vehicle W against the obstacle is detected by the G sensor 14, the control unit 11 operates the second pre-tensioner mechanism 22b to apply to the seatbelt 51 a greater tension than the specified tension by the first pre-tensioner mechanism 22a.

The control unit 11 also determines a turning radius of the traveling vehicle W based on detections of the vehicle speed sensor 12 and the yaw-rate sensor 13. The control unit 11, vehicle speed sensor 12 and yaw-rate sensor 13 form a turning-radius detection device to detect a turning radius of the vehicle. Herein, there may be further provided a lateral acceleration sensor to detect an lateral acceleration of the vehicle W or a steering angle sensor to detect a steering angle of a steering wheel of the vehicle W, and a detection of either one of these sensors may be used in place of the detection of the yaw-rate sensor 13 to determine the turning radius of the traveling vehicle W.

The processing portion 4 of the radar device 1 comprises, as shown in FIG. 2, a data processing portion 4a, a position predicting portion 4b, and an identification determining portion 4c. Herein, the data processing portion 4a detects the obstacle by conducting a filter processing, FFT processing and the like, for the data received by the signal-receiving portion 3. The position predicting portion 4b receives the data from the data processing portion 4a and the vehicle speed and the turning radius of the vehicle W from the control unit 11, and then based on these data makes a decision of properties of the detected obstacle (for example, a distance between the vehicle W and the obstacle, a directional location with respect to the vehicle W (an angle θ with respect to the radar scan detection center line), and a relative speed with respect to the vehicle W), determination as to whether the detected obstacle is a stationary obstacle or not, and prediction as to a relative-moving position of the obstacle with respect to the vehicle W by predicting a traveling path of the vehicle W. The identification determining portion 4c makes a determination as to whether or not the obstacle that is detected at the time a specified period of time (corresponding time to the millimeter-wave scanning term) has lapsed after the detection of the obstacle is identical to the above-described obstacle whose position has been predicted based on the above-described predicted position by the position predicting portion 4b. Specifically, a determination area surrounding this predicted position with a specified distance from this predicted position is set, and if the obstacle detected at the time the specified period of time has lapsed is located within this determination area, it is determined that the obstacle is identical to the obstacle whose position has been predicted. Meanwhile, if the obstacle detected at the time the specified period of time has lapsed is located outside the determination area, it is determined that the obstacle is a new obstacle that is different from the one whose position has been predicted.

The position predicting portion 4b determines whether the detected obstacle is a stationary obstacle or not based on the above-described relative speed and the vehicle speed. The position predicting portion 4b also predicts the traveling path of the vehicle W based on the above-described turning radius. In the present embodiment, this traveling path may be set such that it has a specified width (which is substantially the same as a width of the vehicle W or slightly wider) and its path center line is located on a vehicle center of the vehicle W, wherein a radius of curvature of the traveling path is equal to the above-described inputted turning radius. Thus, the position predicting portion 4b has a stationary-obstacle determination function of determination as to whether the detected obstacle is the stationary one or not and a traveling-path prediction function of the prediction of the traveling path of the vehicle W based on the turning radius.

Further, the position predicting portion 4b predicts a position of the detected obstacle that moves relatively with respect to the vehicle W during the above-described specified period of time. Namely, an offset distance of the obstacle from the center line of the above-described predicted traveling path is calculated at the time the obstacle is detected. And, when it is determined that the detected obstacle is the stationary obstacle, the relative-moving position of the obstacle with respect to the vehicle W is predicted based on this calculated offset distance at the time the specified period of time has lapsed after the detection of the obstacle. Thus, the position predicting portion 4b has a position prediction function of prediction of the relative-moving position of the obstacle with respect to the vehicle W and an offset-distance calculation function of the offset distance from the center line of the above-described predicted traveling path.

Furthermore, the position predicting portion 4b has a correction function, in which the above-described offset distance is corrected. Namely, the above-described offset distance is further corrected based on the turning radius of the traveling vehicle that may be detected by the vehicle speed or yaw rate at the time the specified period of time has lapsed after the detection of the vehicle.

Figure 3:
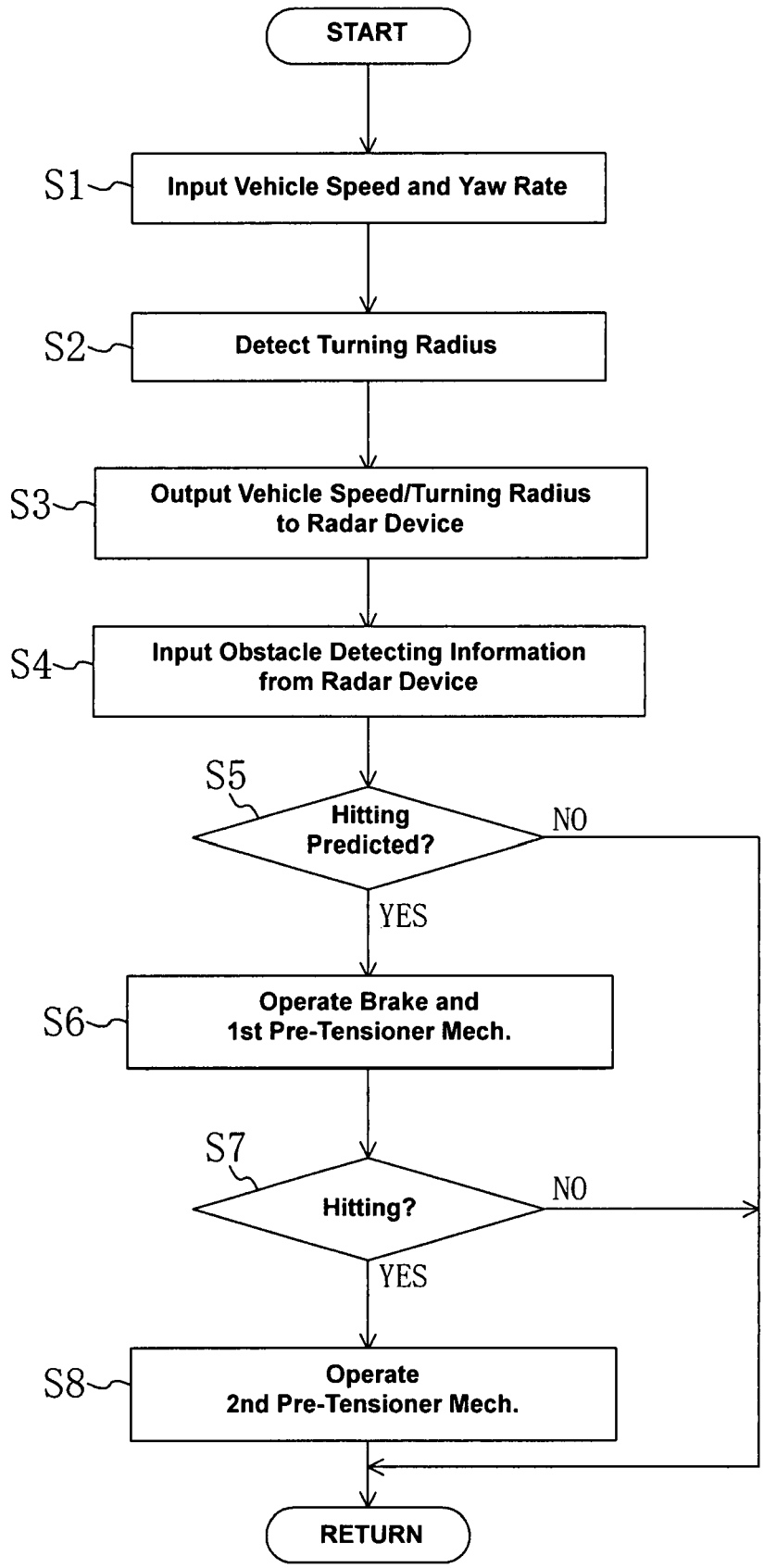
FIG. 3 is a flowchart showing processing of a control unit.

Hereinafter, processing operations of the control unit 11 will be described referring to a flowchart of FIG. 3. The processing operations are repeated every the above-described specified period of time.

First, in step S1, the vehicle speed and the yaw rate that are respectively detected by the vehicle speed sensor 12 and the yaw-rate sensor 13 are inputted. Then, the turning radius of the traveling vehicle W is detected based on the vehicle speed and the yaw rate in step S2. Next, in step S3, the vehicle speed and turning radius are outputted to the position prediction portion 4b of the processing portion 4 of the radar device 1.

In step S4, the obstacle detecting information from the identification determining portion 4c of the processing portion 4 of the radar device 1 is inputted. It is determined based on the inputted obstacle detecting information whether the vehicle W hitting the obstacle is predicted or not in step S5.

When the determination is NO in the step S5, the control sequence returns. When it is YES, the control sequence proceeds to step S6, where the brake operating device 21 is operated to apply the brake to the respective wheels 31 and the first pre-tensioner mechanism 22a of the seatbelt pre-tensioner 22 is operated to apply the specified tension to the seatbelt 51.

Next, in step S7, it is determined based on the information from the G sensor 14 whether the vehicle W hits the obstacle or not. When the determination is NO in the step S7, the control sequence returns. When it is YES, the control sequence proceeds to step S8, where the second pre-tensioner mechanism 22b of the seatbelt pre-tensioner 22 is operated to apply the greater tension to the seatbelt 51, and then the control sequence returns.

Hereinafter, an obstacle detection processing operation of the processing portion 4 of the radar device 1 will be described referring to a flowchart of FIG. 4. This obstacle detection processing operation is also repeated every the above-described specified period of time.

At first, in step S21, data processing of the filter processing, FTT processing and the like based on the data from the signal-receiving portion 3 is conducted at the data processing portion 4a. Then, in step S22, the position predicting portion 4b inputs the above-described processed data from the data processing portion 4a, and the vehicle speed and turning radius of the vehicle W from the control unit 11.

In the next step S23, the position predicting portion 4b conducts a position prediction processing of the obstacle that has been detected at the previous time (the above-described specified period of time ago). Namely, at the time the specified period of time has lapsed from the obstacle detection (i.e., at this time), a position of the obstacle detected at the previous time that moves with respect to the vehicle W during the specified period of time is predicted. Herein, in the previous processing operation, an offset distance of the obstacle from the traveling-path center line of the vehicle has been calculated. And, when it is determined that the obstacle has been the stationary one, the relative-moving position of the obstacle with respect to the vehicle W is predicted based on the calculated offset distance. In this prediction, the above-described offset distance is corrected based on information of the turning radius that is inputted from the control unit 11 at this time.

Specifically, a lateral relative position x (k) at this time is calculated from the following equation:

$$x(k)=x(k-1)-L\times v/R$$

wherein x (k−1) is a lateral relative positron at the previous time; v is a vehicle speed that has been inputted from the control unit 11 at the previous time; L is a distance between the vehicle W and the obstacle at the previous time; and R is a turning radius that is inputted from the control unit 11 at this time.

Figure 5B:
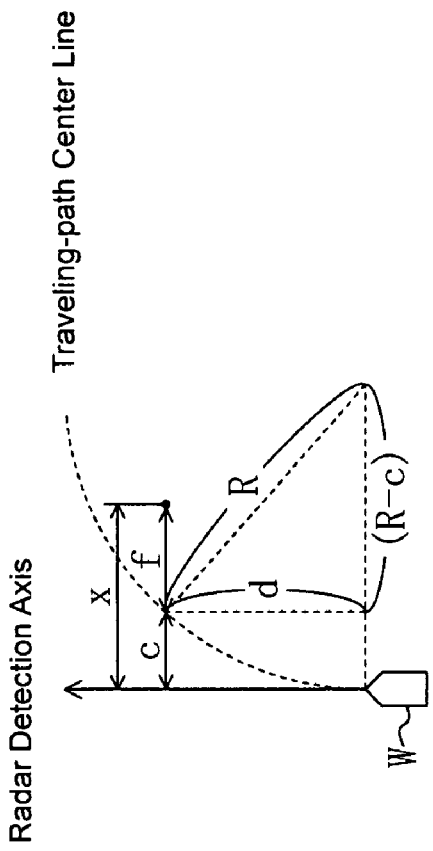
Figure 5A:
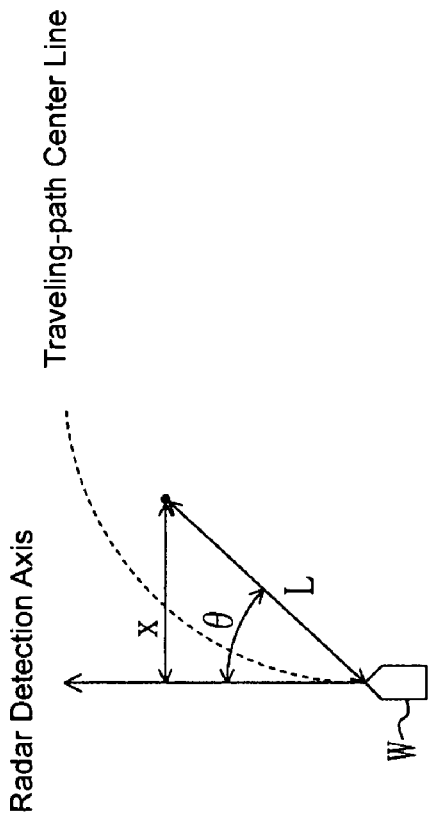

The above-described lateral relative position x, which is a distance of the obstacle from a radar detection axis, as shown in FIG. 5A, is described as follows:

$$x=L\theta$$

The offset distance f of the obstacle from the traveling-path center line, as shown in FIG. 5B, has a relationship with the lateral relative position x that is described as follows:

$$f=x-c$$

wherein c has a relationship with R, that is described as follows:

$$R^2=d^2+(R-c)^2$$

Herein, considering that c has a considerably small value compared to R and d is substantially equal to L, these may be described approximately as follows:

$$c = d^2/2R = L^2/2R$$

Thus, the offset distance (the corrected offset distance, referred to as f') is obtained by subtracting $L^2/2R$ from x (k) at this time. As a result, the offset distance f that is obtained by subtracting the above-described value corresponding to c from the lateral relative position x (k−1) at the previous time is corrected based on the turning radius R. Namely, by correcting the lateral relative position x by a change in the lateral relative position according to the vehicle W's turning with the turning radius R, the above-described offset distance is also corrected. Herein, when the turning radius at this time is smaller than that at the previous time, the offset distance is corrected in a direction of outward turning move. When the turning radius at this time is greater than that at the previous time, the offset distance is corrected in a direction of inward turning move. And, when the turning radius at this time is substantially equal to that at the previous time, the offset distance is not corrected because of substantially no change in the offset distance by the above-described equation.

Herein, the position predicting portion 4b also predicts how other properties of the obstacle than the position change.

Figure 4:
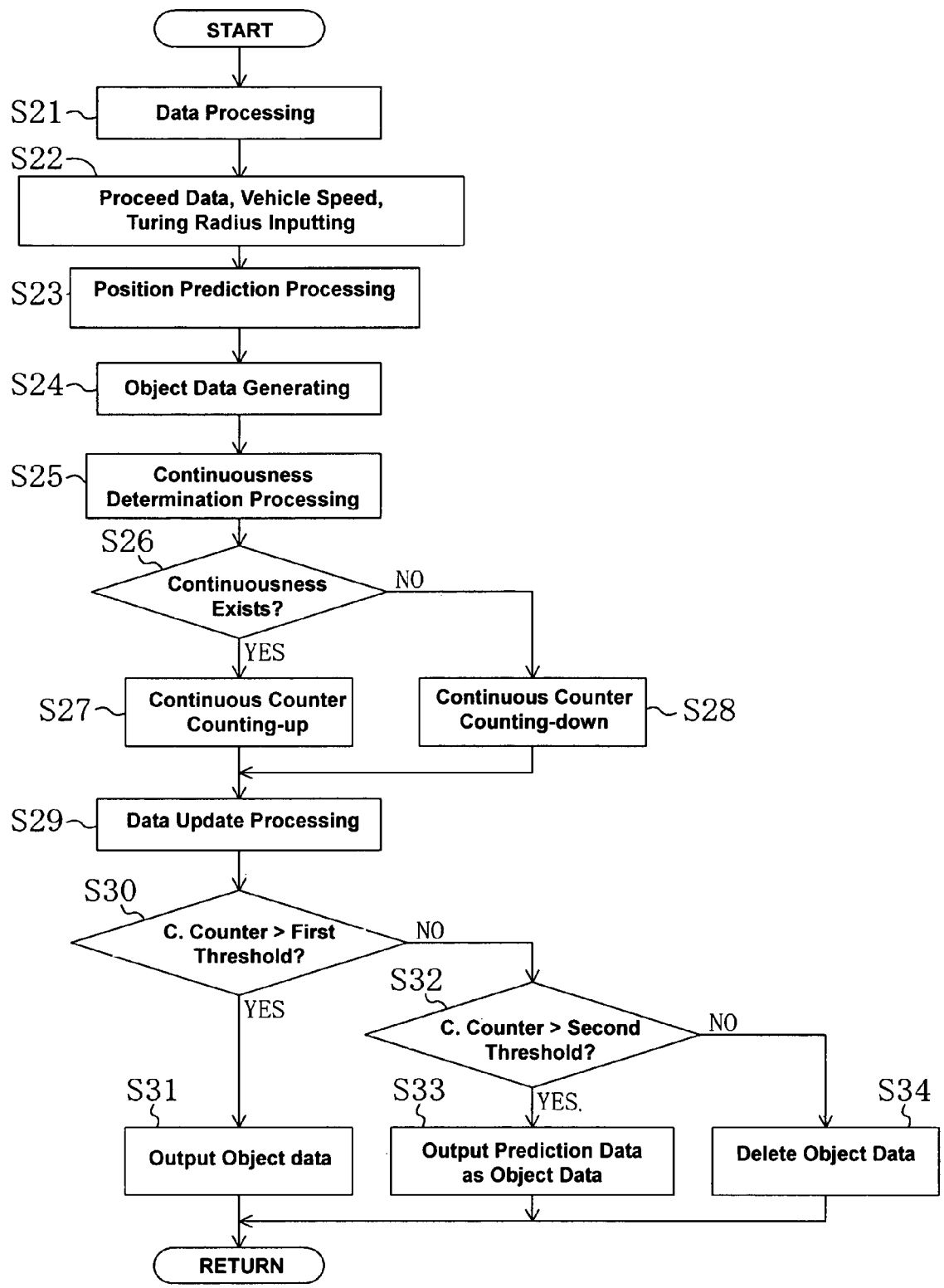
FIG. 4 is a flowchart showing processing of an obstacle detection of a processing portion of a radar device.

Returning to the flowchart of FIG. 4, in the next step S24, the position predicting portion 4b generates object data by determining the obstacle detected at this time. At the same time, it determines whether the obstacle detected at this time is the stationary one or not.

Respective processing operations of the following steps S25-S34 are conducted by the identification determining portion 4c. In step S25, processing for determining continuousness is conducted (identification determination processing). Namely, a determination area surrounding the position predicted by the position predicting portion 4b with a specified distance from this predicted position is set, and if the obstacle detected at this time is located within this determination area, it is determined that the obstacle detected at this time is identical to the obstacle whose position has been predicted (the obstacle detected at the previous time). Meanwhile, if the obstacle detected at this time is located outside the determination area, it is determined that the obstacle detected at this time is a new obstacle.

Then, it is determined whether there exists continuousness or not in step S26. Namely, it is determined whether the determination that the obstacle detected at this time is identical to the obstacle detected at the previous time is made or not. When the determination in the step S26 is YES, the control sequence proceeds to step S27, where a continuous counter for this obstacle is counted up by 1, and then proceeds to step S29.

Meanwhile, when the determination in the step S26 is NO, the control sequence proceeds to step S28, where the continuous counter for this obstacle is counted down by 1, and then proceeds to the step S29.

In the step S29, processing of updating the object data of the obstacle detected at the previous time is conducted by using the object data of the obstacle that is detected at this time. Specifically, in a case where there exists the continuousness, the average of the object data of the obstacle detected at this time and the prediction data of the obstacle detected at the previous time, including the relative-moving position that is predicted at the position predicting portion 4b at this time, is obtained, and this obtained average is stored as the object data of this object. Meanwhile, in a case where there does not exist the continuousness, the above-described prediction data is stored as the object data of the obstacle predicted at the previous time, and the above-described object data of the obstacle detected at this time is stored as the new obstacle.

Then, it is determined whether the above-described continuous counter value is greater than a first threshold or not in step S30. When the determination in the step S30 is YES, the control sequence proceeds to step S31, where the above-described stored object data (the object data in the case where there exists the continuousness) is outputted to the control unit 11 as the obstacle detection information. Then it returns.

Meanwhile, when the determination in the step S30 is NO, the control sequence proceeds to step S32, where it is determined whether or not the above-described continuous counter value is greater than a second threshold (smaller than the first threshold). When the determination in the step S32 is YES, the control sequence proceeds to step S33, where the above-described stored prediction data is outputted to the control unit 11 as the object data (obstacle detection information). Then it returns. Herein, the object data of the new obstacle is not outputted to the control unit 11.

Meanwhile, when the determination in the step S32 is NO, the control sequence proceeds to step S34, where the object data (the above-described stored prediction data) is deleted. Namely, in a case where prediction with no continuousness continuously occurs at certain times (5-10 times, for example) that corresponds to a difference in value between the first threshold and the second threshold, it may be considered that that obstacle does not exist any more, and therefore the object data is deleted.

Figure 6:
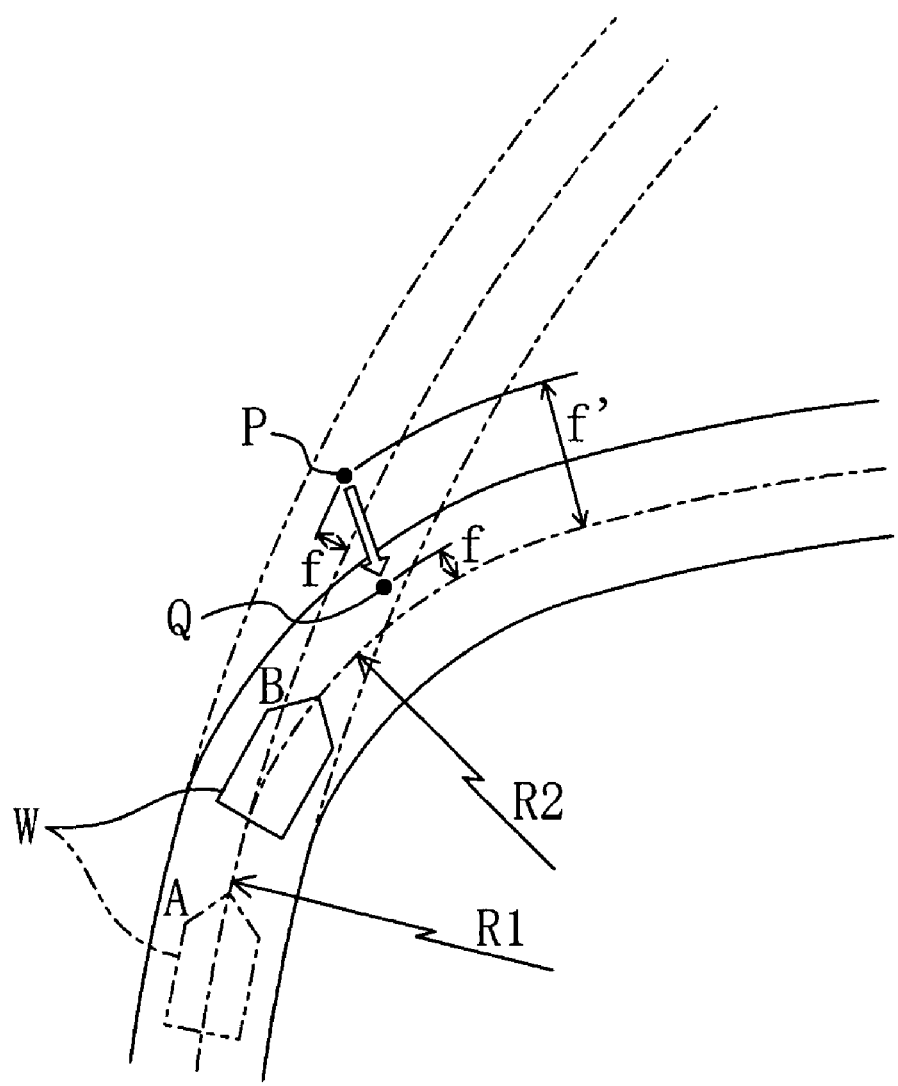
FIG. 6 is a diagram showing a case where the vehicle travels on a road with a curve that changes a radius of curvature of the traveling-path center line during a specified period of traveling time.

Herein, a situation where the vehicle W travels on a road with a curve shown in FIG. 6 will be considered. At a point A, a curvature radius R1 of the predicted traveling-path center line (a turning radius of the vehicle W at the point A) is relatively large. The obstacle (stationary object) that exists at a point P is detected at this point A, and the offset distance f of the obstacle from the traveling-path center line is calculated. Then, the vehicle W moves to a point B after the specified period of time. Herein, a case where a curvature radius R2 of the predicted traveling-path center line at this point B (a turning radius of the vehicle W at the point B) is smaller than the curvature radius R1 of the predicted traveling-path center line is considered. At this point B, the position of the obstacle that has moved relatively with respect to the vehicle W during the specified period of time is predicted. If, herein, it was predicted for the vehicle W that the same offset distance f still exists, that would mean that the obstacle had moved to a point Q, which but should be an wrong prediction. Accordingly, this wrong prediction would cause a situation where because the obstacle does not actually exist around the point Q actually, the average compensation would be continuously conducted at the above-described certain times, assuming that the detection of obstacle failed temporarily. Therefore, in a case where the offset distance f is smaller than a half of the vehicle width and a distance between the average-compensated position and the vehicle W is relatively short, the control unit 11 may predict that the vehicle hits the obstacle, and thereby the brake operating device 21 and the first pre-tensioner mechanism 22a of the seatbelt pre-tensioner 22 may operate. Also, the obstacle at the point P may be dealt as the new obstacle.

According to the present embodiment, however, the above-described offset distance f is corrected to the offset distance f'. Herein, the value of f' is substantially the same as the offset distance of the point P from the center line of the traveling path (traveling path that is predicted at the point B). Thereby, the obstacle is predicted such that it is located at or near the point P. As a result, the obstacle can be detected within the determination area surrounding this predicted position with the specified distance from this predicted position, so this obstacle can be properly dealt as the identical one. Accordingly, since the obstacle at the point P is far away from the traveling vehicle W in this situation case, the wrong prediction of the vehicle hitting the obstacle will not be conducted.

Thus, according to the present embodiment, the relative-moving position of the obstacle of the stationary object with respect to the vehicle W can be properly predicted, any complex processing due to improperly over average-compensations can be prevented, and improper operations of the brake operating device 21 and seatbelt pre-tensioner 22 caused by the wrong hitting prediction can be avoided.

The present embodiment applies the millimeter-wave radar device as the radar device 1, but any other kinds of radar device can be applied.

Also, any other operational devices, such as a warning device, than the brake operating device 21 and the seatbelt pre-tensioner 22 may be applied as well.

Thus, the present invention should not be limited to the above-described embodiment, and any other modifications and improvements my be applied within the scope of a sprit of the present invention.

What is claimed is:

1. An obstacle detecting control device of a vehicle, comprising:
    a radar device to detect a stationary obstacle in front of the vehicle and a position of the stationary obstacle detected;
    an operational-device control device to control an operational device of the vehicle based on obstacle-detection information detected by said radar device; and
    a vehicle-turning radius detecting device to detect a turning radius of the vehicle,
    wherein said radar device is configured to predict a position of the detected stationary obstacle that moves relatively with respect to the vehicle during a specified period of time, said prediction of the position of the stationary obstacle by said radar device comprising calculation of an offset distance of the stationary obstacle from a traveling-path center line of the vehicle at the time the stationary obstacle is detected and correction of said offset distance of the stationary obstacle from the traveling-path center line of the vehicle that is made based on a change in the turning radius of the traveling vehicle detected by said vehicle-turning radius detecting device from the time the stationary obstacle is detected to the time said specified period of time has lapsed.

2. The obstacle detecting control device of a vehicle of claim 1, wherein said radar device is a millimeter-wave radar device.

3. The obstacle detecting control device of a vehicle of claim 1, wherein said vehicle-turning radius detecting device comprises a yaw-rate detection sensor to detect a yaw rate of the vehicle.

4. The obstacle detecting control device of a vehicle of claim 1, wherein said vehicle-turning radius detecting device comprises a lateral-acceleration detection sensor to detect a lateral acceleration of the vehicle.

5. The obstacle detecting control device of a vehicle of claim 1, wherein the operational device of the vehicle is a brake operating device to operate brake of the vehicle.

6. The obstacle detecting control device of a vehicle of claim 1, wherein the operational device of the vehicle is a seatbelt pre-tensioner to restrain a passenger with application of a specified tension to a seatbelt by winding up the seatbelt.

* * * * *